(No Model.) 2 Sheets—Sheet 1.

C. N. BAKER.
PLANTER.

No. 545,837. Patented Sept. 3, 1895.

WITNESSES:
Edward Thorpe
Fred Acker

INVENTOR
C. N. Baker
BY Munn & Co.
ATTORNEYS.

(No Model.) 2 Sheets—Sheet 2.

C. N. BAKER.
PLANTER.

No. 545,837. Patented Sept. 3, 1895.

WITNESSES:
Edward Thorpe
Fred Acker

INVENTOR
C. N. Baker
BY Munn & Co
ATTORNEYS.

UNITED STATES PATENT OFFICE.

CYRUS NEWTON BAKER, OF CRAWFORDSVILLE, INDIANA.

PLANTER.

SPECIFICATION forming part of Letters Patent No. 545,837, dated September 3, 1895.

Application filed April 13, 1895. Serial No. 545,614. (No model.)

*To all whom it may concern:*

Be it known that I, CYRUS NEWTON BAKER, of Crawfordsville, in the county of Montgomery and State of Indiana, have invented a new and useful Improvement in Planters, of which the following is a full, clear, and exact description.

My invention relates to an improvement in planters; and it has for its object to provide a planter which may be employed for planting seed, large or small, and which may also be used, when necessary, as a potato-planter, means being provided for insuring the potato-seed being taken up from the seed-hopper and transferred to the planting mechanism.

Another object of the invention is to construct a planter of the character above set forth in which the seed mechanism may be removed expeditiously and conveniently when the machine is employed for planting potatoes and whereby the potato-planting mechanism may be thrown out of gear and placed out of the way when the machine is employed for planting ordinary seed.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
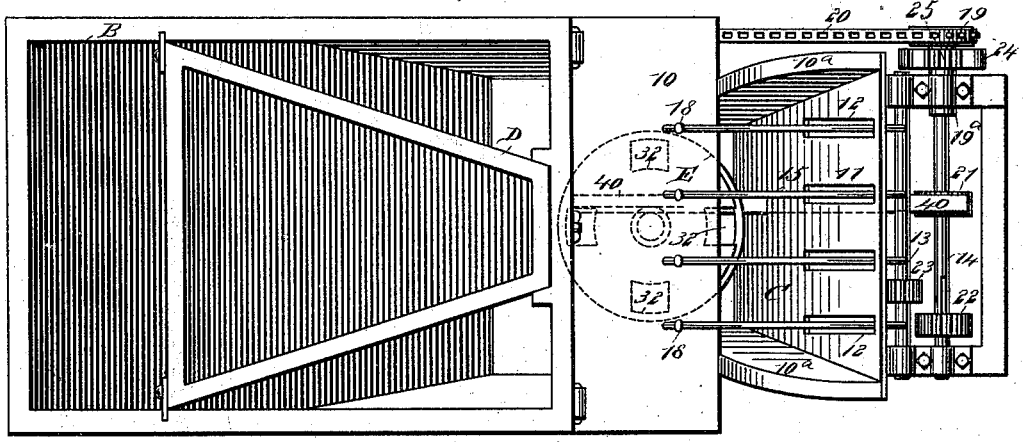
Figure 2:
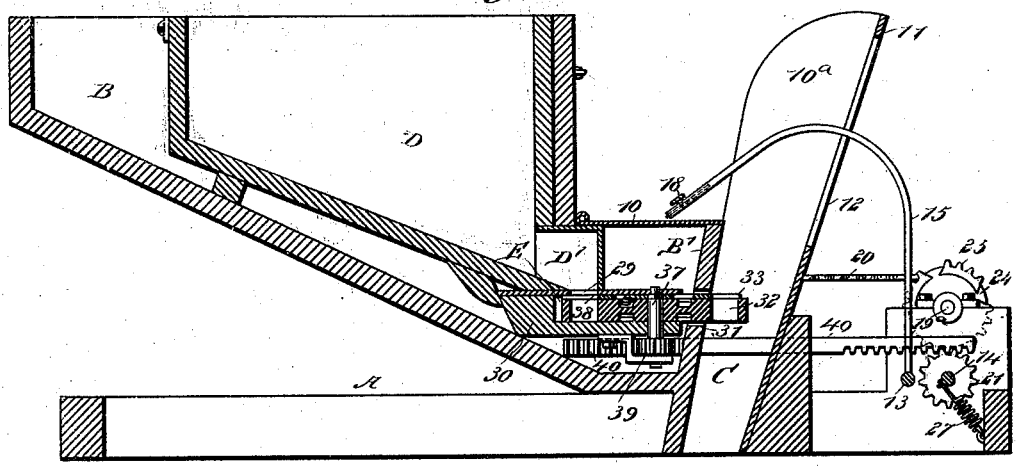
Figure 3:
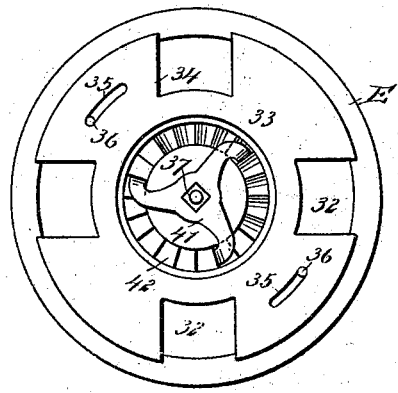
Figure 4:
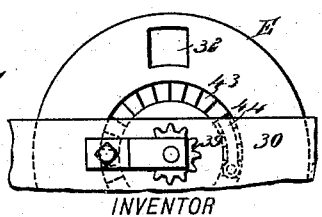
Figure 5:
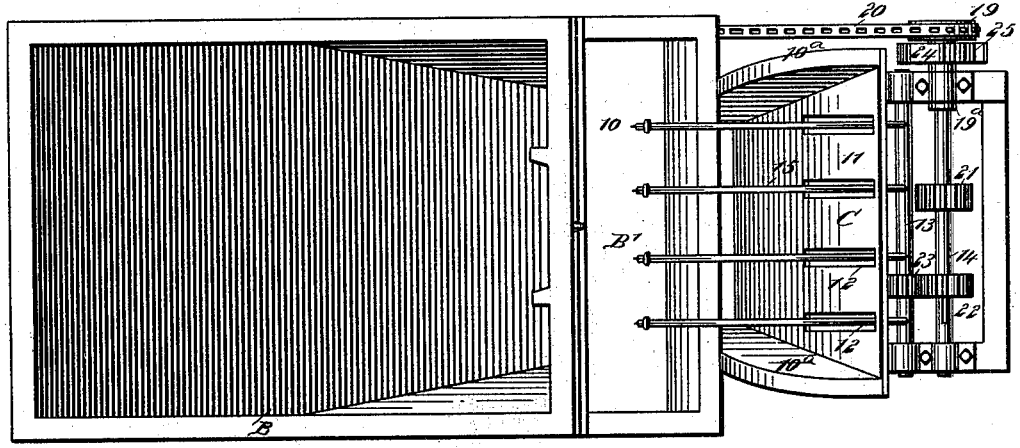
Figure 6:
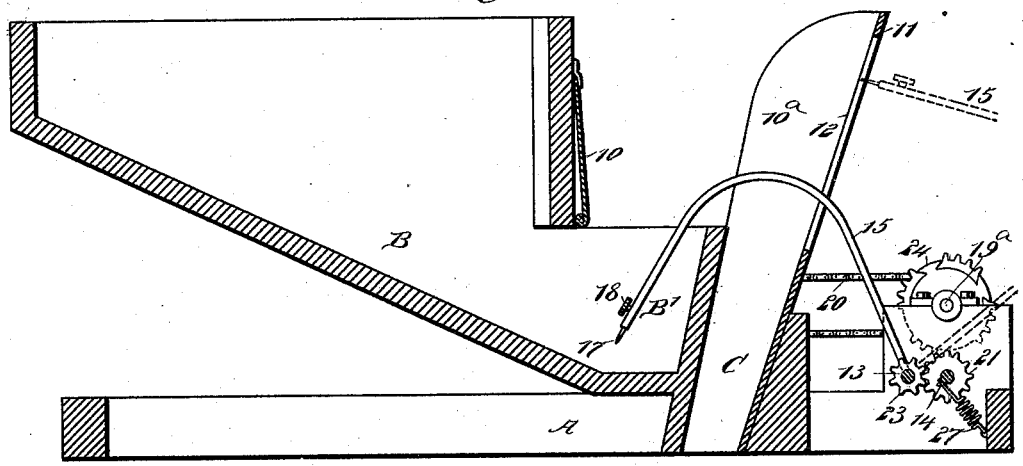
Figure 7:
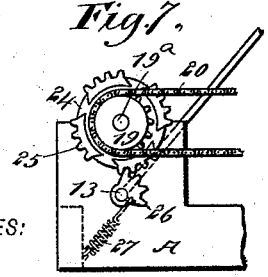
Figure 8:
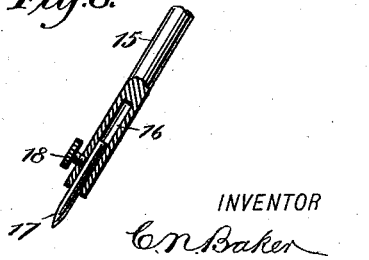

Figure 1 is a plan view of the improved planter. Fig. 2 is a longitudinal vertical section through the machine, illustrating the seed-planting mechanism in operative position. Fig. 3 is a plan view of the seed-dropping wheel. Fig. 4 is a partial inverted plan view of the said wheel. Fig. 5 is a plan view of the machine converted into and used as a potato-planter. Fig. 6 is a vertical longitudinal section through the machine used as a potato-planter. Fig. 7 is a detail view of the driving mechanism of the machine, and Fig. 8 is a detail sectional view of one of the fingers adapted to take up the seed-potatoes.

In carrying out the invention a frame A is provided, which may be of any approved or suitable construction, and upon the said frame a hopper B is supported in any suitable or approved manner, the bottom of the hopper being inclined downwardly and in direction of one end of the frame, and the said hopper at what may be termed its "rear end" is provided with an extension at the bottom, forming a pocket B', normally closed by a cover 10, the cover being hinged, so that it may be fastened up out of the way to disclose the said pocket.

At the back of the pocket B' of the hopper a chute C is constructed, having a forward inclination. The rear wall of the hopper constitutes the forward wall of the chute, and the rear wall of the said chute is carried upward some distance above the pocket B' of the hopper and is provided with side pieces 10ª, while in the rear wall 11 of the said chute a series of longitudinal slots or opening 12 is produced.

At the rear of the frame A, back of the chute C, two shafts 13 and 14 are journaled, the said shafts extending transversely of the frame, as shown in Figs. 1, 2, 5, and 6. The shaft 13 is provided with a series of fingers 15, the said fingers being secured to the said shaft and extending upwardly therefrom and forwardly through the slots 12 in the chute C. The fingers at their forward ends are curved downwardly and in a forwardly direction, so that they may enter freely the pocket B' in the hopper.

At the free end of each finger 15 a socket 16 is formed, in which a needle 17 is held to slide, being controlled by or adjusted through the medium of a set-screw 18.

At one side of the frame, preferably at the rear, a short drive-shaft 19ª is mounted in suitable bearings, being provided with a driving-pulley 19, connected by a belt 20 with any source of power. A pinion 21 is secured about centrally on the shaft 14, and a gear 22 is held to slide on the said shaft and to turn therewith, being adapted to mesh with a pinion 23, securely fastened on the finger-shaft 13. On the drive-shaft 19ª a mutilated gear 24 is secured. This gear is in the form of a wheel, being provided at its periphery with segments of teeth 25, as shown best in Figs. 2, 5, and 7, and the toothed segments are adapted to engage with a segmental gear 26, which may be either fast upon the finger-shaft 13, as shown in Fig. 7, or may be attached to the shaft 14 under the construction shown in Figs. 1, 2, 5, and 6. A spring 27 is attached to the shaft 14 being adapted to turn said shaft in a direction to restore the segmental gear 26 to its normal position when the gear is released by the toothed segment of the wheel or gear 24, the spring acting while the segmental gear 26 is between two of the toothed segments on the said gear or wheel 24.

When the machine is to be employed for planting seed, such as corn, the cover 10 of the pocket B' is closed and the gear 22 is carried out of mesh with the pinion 23 on the finger-shaft 13, and the fingers are carried rearward and made to rest at their free ends on the top or cover 10 of the pocket. An auxiliary hopper D is employed in this case, being fitted in the main hopper B, as shown in Figs. 1 and 2, and this auxiliary hopper is provided with an extension D', carried into the pocket B' a predetermined distance, as illustrated in Fig. 2, the extension of the auxiliary hopper having an opening 29 made in the bottom thereof. In addition to the auxiliary hopper D a seed-drop wheel E is likewise employed. This seed-drop wheel is journaled in a housing or casing 30, and the said housing or casing is made to rest upon the bottom portion of the main hopper B, and the seed-drop wheel is so journaled in the casing that about one-half its periphery will extend rearwardly beyond the casing or housing and into the chute C through an opening 31, made for the purpose in the rear end of the main hopper B. The seed-drop wheel is provided with a number of openings 32 in its face, near the periphery, four openings being illustrated in the drawings, and these openings extend through from top to bottom of the wheel. These openings serve practically as pockets to receive a charge of seed, the said openings or pockets holding the seeds while they are within the casing or housing 30, and these openings may be rendered large or small through the medium of an adjusting-plate 33, which is held to slide, preferably, upon the top surface of the wheel and is provided with a lip 34, which extends downward into each opening 32. The adjusting-plate is held to revolve on the wheel, being provided with guide-slots 35, as shown in Fig 3, receiving pins 36, secured to the body of the wheel. Therefore by turning the adjusting-plate to a greater or less extent the lips 34 will travel longitudinally in the openings 32 and will either reduce or enlarge said openings as may be demanded.

The seed-drop wheel is mounted to turn loosely on a spindle 37, and this spindle is journaled in the housing or casing, and said housing or casing is provided with an opening 38 in the top portion of its forward end, registering with the opening 29 in the auxiliary hopper, and the seed-receiving openings in the wheel are adapted to register one after the other with the housing or casing opening 38. The spindle 37 extends downward below the lower portion of the housing or casing and has attached to its lower end a pinion 39, which is engaged by the teeth at the forward end of the rack 40, the said rack having sliding movement in the frame, extending through the chute and through the lower portion of the main hopper B, the rear end of the said rack 40 having teeth adapted to mesh with the pinion 21 on the transverse shaft 14.

The dropping-wheel E is provided with a circular toothed or ratchet surface 42 around the spindle 37, and a dog 41 is secured upon the upper end of the said spindle, the dog being, preferably, provided with three members, each of which is in engagement with the said ratchet-teeth 42, and a similar ratchet-surface 43 is formed upon the bottom of the dropping-wheel, around the centes, being engaged by a pawl 44, secured to the housing or casing 30, as illustrated in Fig. 4.

When the rack 40 is carried inward, the spindle 37 is rotated in a direction to cause the dog 41 to rotate the dropping-wheel E, the pawl 44 preventing a return movement of the wheel; but when the rack is upon its return or rearward stroke the pawl 44 will hold the dropping-wheel stationary and the dog on the spindle 37 will simply slide over the ratchet-teeth 42 with which it is in contact. In the operation of this form of the machine the seeds are placed in the auxiliary hopper D, which is held in the main hopper by means of suitable guides, and, as the driving-wheel 24 is revolved, when a segmental section 25 thereof engages with the segment 26 it will rock the said segment, expanding the spring 27, and will rotate the shaft 14 in a direction to force the rack 40 forward, thereby revolving the dropping-wheel sufficiently to cause one of its pockets which had been previously loaded with seed to be carried out into the chute C, where the seed will be dumped or discharged into the said chute, and from the said chute to a drill or other conductor, and when the segment on the drive-wheel 24 shall have passed the segmental gear 26 the spring 27 will serve to return the shaft 14 to its normal position and the rack 40 will be drawn rearward, the seed-wheel meanwhile standing still.

When the machine is to be used for planting potatoes, the auxiliary hopper and the seed-wheel, together with its casing, are removed. The pocket B' in the main hopper is then opened and the fingers 15 permitted to drop down therein, as shown in Fig. 6, and the gear 22 on the shaft 14, controlled by the driving-wheel, is carried into mesh with the pinion 23 on the finger-shaft 13. The potatoes are cut to suitable size and placed in the main hopper, whereupon they will be fed down into the pocket B', and the action of the spring 27 will be to hold the fingers in the said pocket, and the needles 17 of the fingers will penetrate and receive one of the slices of potato. As the segmental gear 26 is oscillated in the manner heretofore set forth the fingers will be carried rearward, as shown in dotted lines in Fig. 6, and the potatoes attached to the needles will be stripped off by the needles passing through the slots 12 in the chute C, causing the seed to drop into said shute to be delivered to the ground, and the moment that the segmental gear 26 is released by the driving-wheel 24 the spring 27 will carry the fingers with considerable force into the pocket B' and cause their needles to take up other seed.

It will thus be observed that a machine is provided capable of being used for planting potatoes or seed of any description, as desired, and that the attachments used will not interfere one with the action of the other.

Having thus described my invention, I claim as new and desire to secure by Letters Patent—

1. In a planter, a hopper, a chute connected therewith, a seed wheel rotating partially within the hopper and partially within the chute, a spring controlled shaft operatively connected with the said wheel, and a drive shaft provided with mutilated gear and having intermittent driving connection with the spring controlled shaft, as and for the purpose set forth.

2. In a planter, a hopper, a chute connected therewith, a seed wheel mounted in a casing, said wheel being held to revolve partially within the hopper and partially within the chute, the casing being removable from the hopper, a rack, a pinion, dogs operated by the said pinion and operating to revolve the said wheel, a detent in connection with the wheel, and a driving mechanism, substantially as described, for the said rack and pinion, as and for the purpose specified.

3. In a planter, a hopper, a chute connected therewith, a seed wheel mounted in a casing, said wheel being held to revolve partially within the hopper and partially within the chute, the casing being removable from the hopper, a rack and pinion, dogs operated by the said pinion and operating to revolve the said wheel, a detent in engagement with the wheel, a spring-controlled shaft, a driving wheel having intermittent driving connection with the said shaft, and a gear carried by the shaft and meshing with the said rack, as and for the purpose specified.

4. In a planter, a hopper, a drive shaft provided with segmental gear, a second segmental gear wheel intermittently operated by the gear wheel on the drive shaft, a shaft moved in one direction thereby, a spring for moving the said shaft in the opposite direction, and fingers carried by the said shaft entering the hopper and having their free ends sharpened to receive potato or similar seed, as and for the purpose specified.

5. In a planter, a hopper, a chute adjacent to the hopper, a drive shaft provided with a segmental gear, a shaft provided with fingers, the said fingers being carried through openings in the said chute, and extending at their free ends within the hopper, the free ends being sharpened to receive potato or similar seed, a segmental gear operated from the segmental gear on the drive shaft and intermittently moving the finger shaft in one direction, and means substantially as described for moving the shaft in the reverse direction, as and for the purpose set forth.

6. In a planter, a hopper, a drive shaft provided with segmental gear, two transversely extending shafts at the rear of the frame, one of said shafts being provided with a series of fingers, a gear held to slide on the other shaft and turn therewith, and adapted to engage with a gear on the finger shaft, a segmental gear carried by one of the said transversely extending shafts, and adapted to be intermittently engaged by the segmental gear on the drive shaft, whereby the finger shaft is intermittently moved in one direction, and a spring for moving the finger shaft in the opposite direction, the fingers carried by the said shaft being adapted to enter the hopper and having their free ends sharpened to receive potato or similar seed, as and for the purpose specified.

CYRUS NEWTON BAKER.

Witnesses:
ALBERT C. JENNISON,
CHARLES HENRY HARNELL.